(No Model.)

J. E. ASH.
LAWN MOWER.

No. 444,643. Patented Jan. 13, 1891.

Witnesses
J. Watson Sims
C. W. Miles

Inventor
John E. Ash
By his Attorneys
Wood & Boyd

THE NORRIS PETERS CO., PHOTO-LITHO., WASHINGTON, D. C.

UNITED STATES PATENT OFFICE.

JOHN E. ASH, OF CARTHAGE, ASSIGNOR OF ONE-HALF TO CHARLES A. SAUT-MYER, OF CINCINNATI, OHIO.

LAWN-MOWER.

SPECIFICATION forming part of Letters Patent No. 444,643, dated January 13, 1891.

Application filed February 20, 1890. Serial No. 341,118. (No model.)

*To all whom it may concern:*

Be it known that I, JOHN E. ASH, a citizen of the United States, and a resident of Carthage, in the county of Hamilton and State of Ohio, have invented certain new and useful Improvements in Lawn-Mowers, of which the following is a specification.

One of the objects of my invention is to provide a delivering-chute attached to an ordinary lawn-mower just above and below the knife for conveying the cut grass backward clear of the machine.

Another object of my invention is to provide a grass-receptacle adjustably connected in the rear of the knives so that it may be readily taken off and emptied with little trouble.

Another object of my invention is to support this grass-receptacle upon the lower frame and driving-handle so as to throw the weight and draft all upon the ground-wheels.

To accomplish all these objects my invention involves the features of construction, the combination or arrangement of devices, and the principles of operation hereinafter described and claimed, reference being made to the accompanying drawings, in which—

Figure 1:
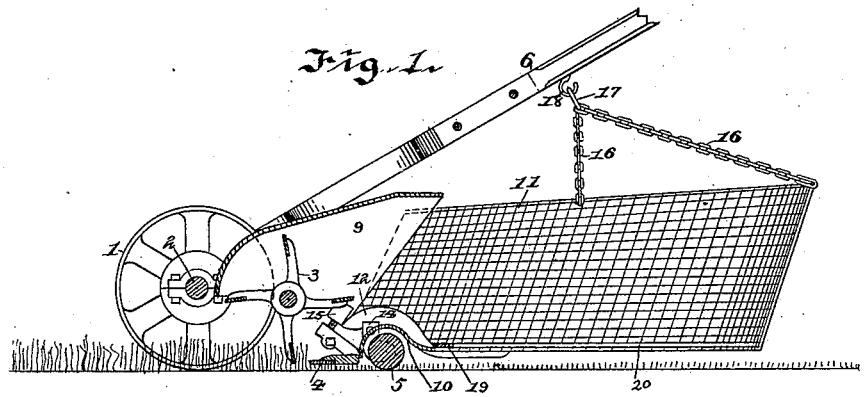
Figure 2:
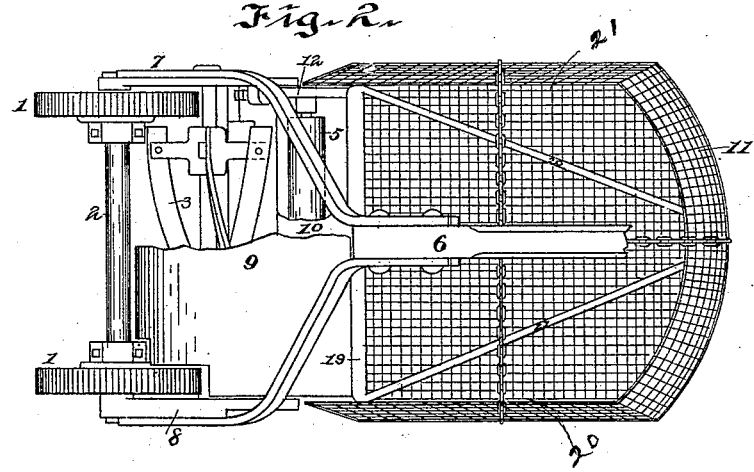
Figure 3:
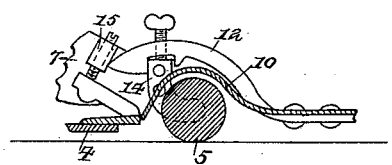
Figure 4:
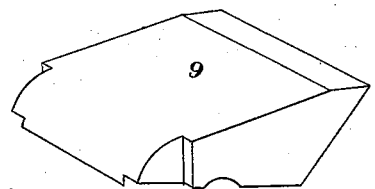
Figure 5:
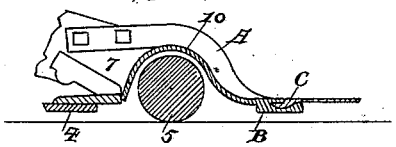

Figure 1 is a central vertical longitudinal section of my improvement. Fig. 2 is a top plan view with part of the chute broken away. Fig. 3 is an enlarged broken section of Fig. 1. Fig. 4 is a perspective view of the chute. Fig. 5 is a modification of the method of detaching the grass-receptacle.

1 represents ground or driving wheels which are mounted on the axle 2 in the usual manner.

3 represents the revolving cutting-blades.

4 represents a stationary knife.

5 represents the ground-roller.

6 represents the handle.

7 8 represent the frame-pieces.

9 represents the top of the deflecting-chute, which is made of suitable material—such as sheet-iron—and notched to fit between the wheels with its front end curved over coming close to the knives, as shown in Fig. 1. This chute is carried back a sufficient distance to come over the grass-receptacle hung in the rear. The bottom of the chute is formed by the curved plate 10 located in rear of the knife and attached to the grass-receptacle, and preferably of curved form to drop below so as to allow the grass to drop down behind the roller and to increase the depth of the grass-receptacle 11. This curved form also allows the grass-receptacle to be over the roller. It passes between the roller and the under or behind knife bar. It is secured in position by means of hooks 12, which are rigidly attached to the frame of the grass-receptacle 11, and are provided with notches at the forward end to engage with the lugs 14. The hooks are shown as bearing against lugs 15.

The grass-receptacle is connected to the curved plate 10, and the latter is supported by the hooks 12, thereby allowing the grass-receptacle to be readily detached from the mower and emptied and re-engaged again for use.

In order to properly hold the grass-receptacle in position and to relieve the lawn-mower of strain, I provide a suspending tripod-chain 16. 17 represents a ring into which the several chains are hinged. 18 represents a hook in the handle over which the ring engages. I am thus enabled to support the weight all upon the ground driving-wheels and yet allow the grass-receptacles to be readily taken off and emptied and re-engaged without disturbing the operation of the machine.

In order to make the grass-receptacle light and strong I provide a flaring frame. 19 represents the front bar of the grass-receptacle to which the curved plate 10 is attached. 20 21 represent the arms of said frame coming together at a point in the rear to which the wire fabric or other material comprising the basket of the grass-receptacle is attached. The tripod-chains are attached to the basket. I am thus enabled to make a light and strong grass-receptacle, the body of which may be made of wire, gauze, canvas, or any other light material. By this means I am enabled to make a perfect grass-catcher without materially adding to the draft of the mower. The support all being upon the ground-wheel the increased strain is reduced to the minimum.

In Fig. 5 I have shown a modification which consists in attaching the bottom of the chute permanently to the frame-pieces 7 and 8 by means of brackets A bolted thereto. The bottom of the chute formed by the curved plate 10 is also shown as attached to the brackets A. It is also attached to the cross-bar B, in which is formed recesses for hooks C. These hooks are attached to the grass-receptacle 11, so that the grass-receptacle is detachable in this instance and the chute-boundaries permanently attached to the frame. It is equivalent to the form shown in the other figures.

Having described my invention, what I claim is—

1. The combination, with a lawn-mower having a ground-roller 5 and propelling-handle 6, of the deflecting-chute 9, curved wholly over the cutters and having its forward end notched at the sides and projecting between the ground-wheels, and the grass-receptacle 11, separate and independent of the deflecting-chute and suspended at its rear portion from the handle by a chain connection, and provided with the attached rigid plate 10, arched over the ground-roller, substantially as described.

2. The combination, with a lawn-mower having a ground-roller 5, the propelling-handle 6, and the upwardly-projecting lugs 14, of the deflecting-chute 9, curved over the rotary cutter and projecting forwardly between the ground-wheels, and the grass-receptacle 11, independent of the deflecting-chute, suspended from the handle, and having the attached rigid plate 10, arched over the ground-roller, and the forwardly-projecting hooks 12, detachably engaging the lugs, substantially as described.

In testimony whereof I have hereunto set my hand.

JOHN E. ASH.

Witnesses.
 HAYWARD D. GATCH,
 J. WATSON SIMS.

It is hereby certified that the name of the assignee in Letters Patent No. 444,643, granted January 13, 1891, upon the application of John E. Ash, of Carthage, Ohio, for an improvement in "Lawn Mowers," was erroneously written and printed "Charles A. Sautmyer," whereas said name should have been written and printed *Charles A. Santmyer;* and that the Letters Patent should be read with this correction therein that the same may conform to the record of the case in the Patent Office.

Signed, countersigned, and sealed this 3d day of March, A. D. 1891.

[SEAL.] CYRUS BUSSEY,
*Assistant Secretary of the Interior.*

Countersigned:

C. E. MITCHELL,
*Commissioner of Patents.*